US006454953B2

(12) United States Patent
Sakai et al.

(10) Patent No.: US 6,454,953 B2
(45) Date of Patent: Sep. 24, 2002

(54) SOLID ELECTROLYTIC CAPACITOR AND METHOD FOR PRODUCING THE SAME

(75) Inventors: Atsushi Sakai, Nagano (JP); Yuji Furuta, Nagano (JP); Katsuhiko Yamazaki, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/863,413

(22) Filed: May 24, 2001

Related U.S. Application Data
(60) Provisional application No. 60/244,878, filed on Nov. 2, 2000.

(30) Foreign Application Priority Data

May 24, 2000 (JP) ........................................ 2000-153559

(51) Int. Cl.$^7$ ................................................ H01G 9/00
(52) U.S. Cl. ............................. 216/6; 216/34; 216/35; 216/96; 216/100; 216/108
(58) Field of Search ............................... 216/6, 34, 35, 216/96, 100, 108

(56) References Cited

U.S. PATENT DOCUMENTS

| | | | | |
|---|---|---|---|---|
| 4,244,792 A | * | 1/1981 | Baldwin ........................ | 134/3 |
| 5,187,650 A | * | 2/1993 | Kudoh et al. .................... | 29/3 |
| 5,202,290 A | * | 4/1993 | Moskovits ......... | 148/DIG. 122 |
| 5,868,948 A | * | 2/1999 | Fujii et al. .................... | 216/101 |
| 5,922,215 A | * | 7/1999 | Pless et al. .................. | 216/102 |

FOREIGN PATENT DOCUMENTS

| | | | |
|---|---|---|---|
| JP | 2-15611 | 1/1990 | ............ H01G/9/02 |
| JP | 8-3156 | 1/1996 | ......... C07D/333/72 |
| JP | 10-32145 | 2/1998 | .......... H01G/9/028 |

* cited by examiner

Primary Examiner—Randy Gulakowski
Assistant Examiner—Shamim Ahmed
(74) Attorney, Agent, or Firm—Sughrue Mion, PLLC

(57) ABSTRACT

An object of the present invention is to provide a solid electrolytic capacitor with excellent electrostatic capacitance and reduced dispersion of capabilities by treating the surface of a chemically formed aluminum film to form a dielectric film which is in contact an electrically conducting substance provided thereon with sufficiently high adhesion. Another object of the present invention is to provide a method for producing the solid electrolytic capacitor, which includes providing an organic electrically conducting polymer as a solid electrolyte on a chemically formed aluminum substrate having thereon an aluminum oxide dielectric film, where a chemically formed aluminum substrate, which was cut into a predetermined shape, is treated with an aqueous acid solution to dissolve a part of the dielectric film on the substrate surface. The present invention also provides an aluminum solid electrolytic capacitor obtained by the method, and a chemically formed aluminum substrate for aluminum solid electrolytic capacitors.

8 Claims, 3 Drawing Sheets

×30,000

×30,000 x30,000

SOLID ELECTROLYTIC CAPACITOR AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/244,878 filed Nov. 2, 2000 pursuant to 35 U.S.C. §111(b).

FIELD OF THE INVENTION

The present invention relates to an aluminum solid electrolytic capacitor using an organic electrically conducting polymer as the solid electrolyte, and a method for producing the capacitor. More specifically, the present invention relates to an aluminum solid electrolytic capacitor, in which the pore distribution (e.g., pore volume, average pore size) of the dielectric film is adjusted by removing burrs of the chemically formed aluminum substrate cut into a predetermined shape and dissolving a part of the aluminum oxide dielectric film on the substrate surface. As a result, the organic electrically conducting polymer provided thereon is improved in adhesive property. The present invention also relates to a method for producing the capacitor and a chemically formed aluminum substrate for aluminum solid electrolytic capacitors.

BACKGROUND OF THE INVENTION

A solid electrolytic capacitor using an electrically conducting polymer has a fundamental structure so that a high-density and uniform oxide dielectric film is formed on the surface of a valve-acting metal, such as aluminum, tantalum or titanium, previously subjected to an etching treatment to roughen the surface, an electrically conducting polymer as a solid electrolyte is formed on the oxide dielectric film, an anode lead wire is connected to the anode terminal (metal surface area having no solid electrolyte) of the valve-acting metal, and a cathode lead wire is connected to the electrically conducting layer containing an electrically conducting polymer, and the entire structure is molded with an insulting resin such as epoxy resin.

Among the valve-acting metals, aluminum is advantageous because the surface area can be easily expanded by an etching treatment, and the oxide film formed on the surface by an anodization treatment (chemical forming treatment) using the aluminum as the anode can be used as a dielectric film. Therefore, a capacitor having a smaller size and a larger capacitance can be produced at a lower cost compared with other capacitors. Because of these reasons, the aluminum solid electrolytic capacitor is being widely used.

The etching treatment of aluminum is generally performed by an alternating current etching in an electrolytic solution containing chloride ion or the like. By this etching treatment, a large number of pores are formed on the surface and the surface area is expanded. The radius of a pore formed varies depending on the current applied and the treatment time, but is approximately from 0.05 to 1 $\mu$m.

Subsequently, the surface with pores is subjected to an anodization treatment (chemical forming treatment). By this chemical forming treatment, a high-density and uniform anodic oxide film (dielectric film) having a thickness of approximately from 0.005 to 0.1 $\mu$m is formed.

The thus-obtained chemically formed aluminum substrate is cut into a predetermined size for a solid electrolytic capacitor. At this time, a protruding portion (burr) remains on the edge of the cut surface but the exposed aluminum (ground metal) portion is subjected to chemical re-forming to form an anodic oxide film (dielectric film) on the cut surface part.

An electrostatic capacitance of a capacitor device is determined by the thickness of the dielectric film, the dielectric constant of the dielectric film, and the area of the dielectric film covered by a solid electrolyte (electrically conducting substance). However, the electrostatic capacitance of conventional aluminum solid electrolytic capacitors is as small as about 80% of the theoretical value of an electrostatic capacitance (C) of a chemically formed aluminum foil (C=$\epsilon$A/t, wherein $\epsilon$ is a dielectric constant of the dielectric aluminum oxide, A is a surface area of the dielectric layer, and t is a thickness of the dielectric layer). Moreover, the dispersion in the electrostatic capacitance of individual products is very large. These are considered to be attributable to insufficient results in the thickness and dielectric constant of the dielectric film and in the covering area and adhesion of the solid electrolyte (electrically conducting substance) to the dielectric film when a conventional chemical forming method is used.

There is another problem in that the dielectric film in the burr portion generated during cutting or in the peak portion of the cut surface generates heat due to the current concentrated during loading of a voltage and ruptures. As a result, the solid electrolyte deteriorates in capability (e.g., voltage resistance, heat resistance).

Accordingly, an object of the present invention is to provide a solid electrolytic capacitor improved in electrostatic capacitance and reduced in dispersion of capability by treating the surface of a chemically formed aluminum film so that a dielectric film with which the electrically conducting substance provided thereon can be contacted with good adhesion over a sufficiently large contact area. Another object of the present invention includes providing a method for producing this solid electrolytic capacitor.

Another object of the present invention is to provide a solid electrolytic capacitor which is free from reduction in the properties attributable to heat generation resulting from the concentration of current by removing burrs or peak portions on the cut surface (cut end) of the aluminum substrate. Another object of the present invention includes providing a method for producing this solid electrolytic capacitor.

As a result of extensive investigations to solve the above-described problems, the present inventors discovered that when a chemically formed aluminum substrate having an aluminum oxide dielectric film is treated with an aqueous acid solution to dissolve a part of the dielectric film, surprisingly, the adhesion between the solid electrolyte (electrically conducting polymer) and the substrate is enhanced. As a result, a capacitor produced has increased electrostatic capacitance and reduced dispersion in the electrostatic capacitance of individual capacitors. Furthermore, it has been verified that the burrs on the cut surface and the peak portions of the cut end are dissolved and the deterioration of properties due to heat generation resulting from the concentration of current is mitigated when the above-described treatment with an aqueous acid solution is used. Based on this knowledge, the present invention has been accomplished.

SUMMARY OF THE INVENTION

The present invention provides an aluminum solid electrolytic capacitor, a method for producing the capacitor and a chemically formed aluminum foil for aluminum solid electrolytic capacitors, described below.

(1) A method for producing an aluminum solid electrolytic capacitor, comprising cutting a chemically formed aluminum substrate having thereon an aluminum oxide dielectric film into a predetermined shape, treating the chemically formed aluminum substrate with an aqueous acid solution to dissolve a part of the dielectric film on the substrate surface, and providing an organic electrically conducting polymer as a solid electrolyte on a chemically formed aluminum substrate.

(2) A method for producing an aluminum solid electrolytic capacitor, cutting a chemically formed aluminum substrate having thereon an aluminum oxide dielectric film into a predetermined shape, treating the chemically formed aluminum substrate with an aqueous acid solution to dissolve a part of the dielectric film on the substrate surface and burrs generated during cutting, and providing an organic electrically conducting polymer as a solid electrolyte on a chemically formed aluminum substrate.

(3) The method for producing an aluminum solid electrolytic capacitor as described in 1 or 2 above, wherein the aqueous acid solution comprises an acid selected from sulfuric acid, oxalic acid, chromic acid and phosphoric acid.

(4) The method for producing an aluminum solid electrolytic capacitor as described in 3 above, wherein the aqueous acid solution is an aqueous oxalic acid solution.

(5) The method for producing an aluminum solid electrolytic capacitor as described in 4 above, wherein a concentration of the aqueous oxalic acid solution is from about 0.1 to 15% by mass.

(6) The method for producing an aluminum solid electrolytic capacitor as described in any one of 1 to 5 above, wherein the treatment with an aqueous acid solution is a dipping treatment of the chemically formed aluminum substrate.

(7) The method for producing an aluminum solid electrolytic capacitor as described in 6 above, wherein the aqueous acid solution is an aqueous oxalic acid solution having a concentration of about 0.1 to 15% by mass, a dipping time is from 20 seconds to 10 minutes, and a treatment temperature is from about 15 to 40° C.

(8) The method for producing an aluminum solid electrolytic capacitor as described in any one of 1 to 7 above, further comprising chemically re-forming the aluminum cut surface after the treatment with an aqueous acid solution.

(9) An aluminum solid electrolytic capacitor produced by the method described in any one of 1 to 8 above.

(10) A chemically formed aluminum substrate for an aluminum solid electrolytic capacitor, comprising a chemically formed aluminum substrate having thereon a dielectric film formed by a treatment with an aqueous acid solution, and the dielectric film having an average pore radius of 1,000 Å or more and a pore volume of 1.4 cm$^3$/g or less.

(11) An aluminum solid electrolytic capacitor using the chemically formed aluminum substrate described in 10 above.

DESCRIPTION OF THE PRESENT INVENTION

Figure 1:
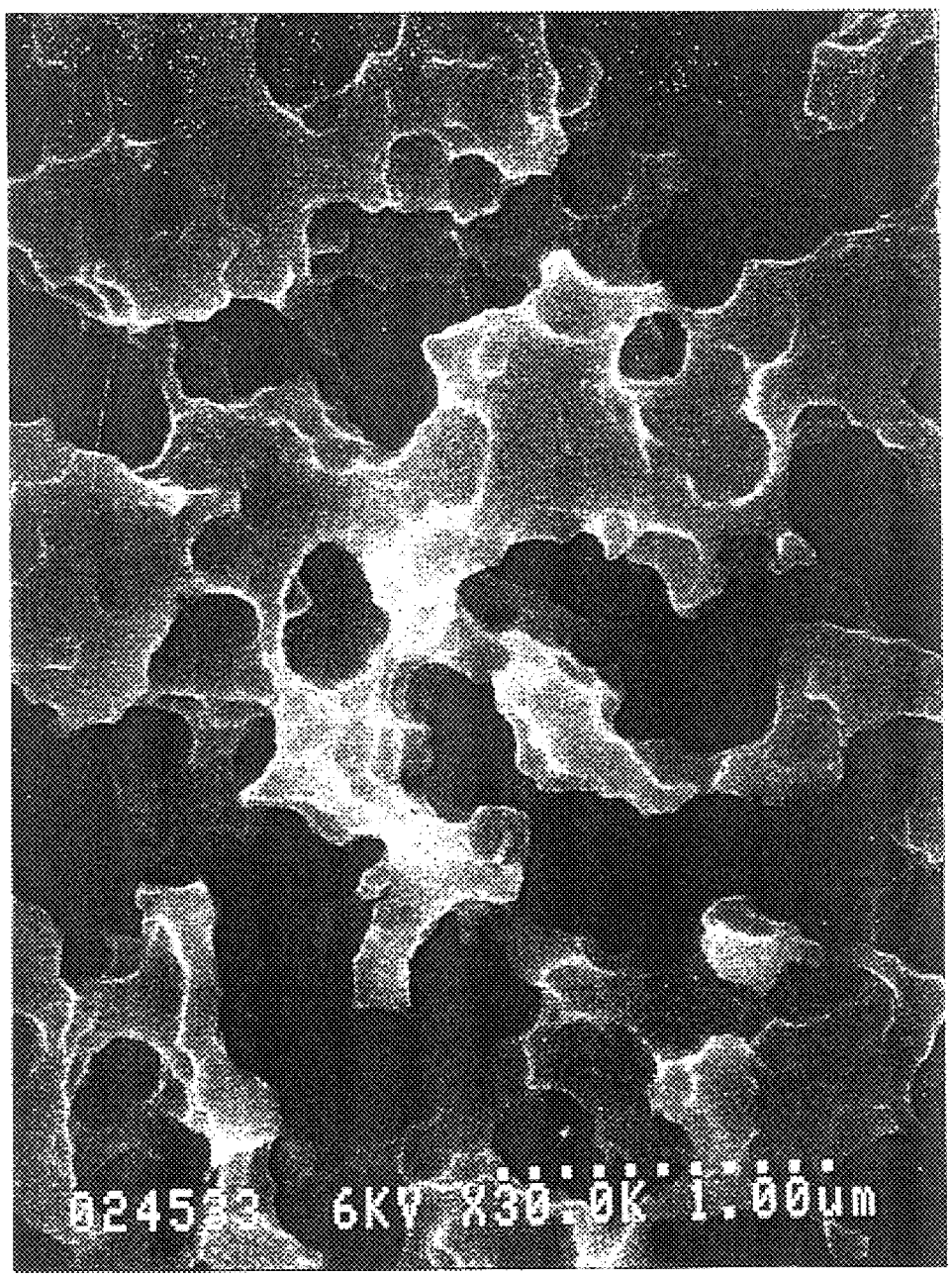
FIG. 1 is a scanning electron microscope picture (×30,000) showing a cross section of a dielectric film after an acid treatment.

The present invention is described in detail below.

In manufacturing an aluminum solid electrolytic capacitor, a chemically formed aluminum foil, which is available on the market, is cut into a desired predetermined shape for the solid electrolytic capacitor after the formation of an aluminum oxide dielectric film. The ground aluminum portion on the cut surface is subjected to chemical re-forming and then, an electrically conducting polymer layer is formed. However, the solid electrolytic capacitors manufactured by such method have a dispersion in electrostatic capacitance as described above.

The present inventors believed that the dispersion in the capability of solid electrolytic capacitors is probably attributable to the surface properties of the chemically formed aluminum substrate. Therefore, the average pore size and the pore volume (cm$^3$/g) on the surface of a chemically formed aluminum substrate (dielectric film) available on the market and on the surface of a chemically formed aluminum foil where a cut end portion is subjected to a chemical re-forming treatment in a conventional manner were measured by mercury intrusion porosimetry using a porosimeter 2000WS manufactured by Fisons. As a result thereof, the dielectric film of the chemically formed aluminum foil available on the market had an average pore radius of approximately 540±50 Å and a pore volume of 1.49±0.05 cm$^3$/g. The chemically formed aluminum substrate which was subjected to chemical re-forming in a conventional manner, had an average pore radius of 650 to 750 Å and a pore volume of 0.4 to 0.6 cm$^3$/g.

The present inventors also discovered that, when a chemically formed aluminum substrate available on the market is cut into a predetermined shape and then treated with an aqueous acid solution to dissolve a part of the dielectric film, surprisingly, the electrostatic capacity of the capacitor increases and the dispersion in the electrostatic capacitance of individual capacitors decreases.

At present, as a result of this acid dissolving treatment, the pore volume of the dielectric film on the chemically formed aluminum substrate decreases and the average pore radius increases. More specifically, it is confirmed that with a pore volume of 1.4 cm$^3$/g (percentage decrease in the pore volume: 94%) or less, preferably 0.4 cm$^3$/g or less, and an average pore radius of 600 Å or more, preferably 1,000 Å or more, excellent properties can be obtained.

It is not clearly known why the properties of a solid electrolytic capacitor are improved (namely, the electrostatic capacitance increases and the dispersion decreases) by the change in the surface properties, but the reason therefor is considered to be because the contact area of the dielectric film with the electrically conducting polymer is rendered uniform, thereby substantially increasing the effective contact area with the electrically conducting polymer.

Also, it is confirmed that burrs on the cut end generated during cutting are dissolved by treatment with an acid solution, and the peak portions of the cut end are changed into a rounded shape. As a result, the deterioration in the properties due to generation of heat caused by the concentration of current is mitigated.

According to the method of the present invention, a part of the (aluminum oxide) dielectric film on a chemically formed aluminum substrate available on the market is dissolved with an acid solution, thereby reducing the dispersion in the electrostatic capacitance.

In the present invention, the acid used for dissolving a part of the dielectric layer and burrs generated during cutting is not limited, provided it has properties of dissolving aluminum and aluminum oxide. Either an inorganic acid, such as sulfuric acid, chromic acid or phosphoric acid, or an organic acid, such as oxalic acid may be used. Among those acids, in view of workability, oxalic acid and sulfuric acid are preferred, and oxalic acid is more preferred. The concentration of the acid is selected from a range that gives an appropriate dissolution rate of the dielectric material in view of workability. The concentration varies depending on the kind of acid, but when oxalic acid is used, the concentration is preferably from about 0.1 to 15% by mass, more preferably from about 1 to 10% by mass, and when sulfuric acid is used, the concentration is preferably from about 5 to 25% by mass, more preferably from about 10 to 15% by mass.

The method of contacting a chemically formed aluminum substrate with an aqueous acid solution is not particularly limited and examples thereof include a dipping method, a coating method and an atomization method. Among these, a dipping method is preferred.

In the dipping method, the dipping (contact) time varies depending on the kind and concentration of acid and is not specified. However, when oxalic acid, which is a preferred acid, is used, the dipping time is approximately from 20 seconds to 10 minutes with an oxalic acid concentration of about 1 to 10% by mass.

As the temperature of the aqueous acid solution during contacting is higher, the dissolution rate of the film increases, and therefore, a temperature near room temperature (15 to 40° C.) is usually selected.

By treating the chemically formed aluminum foil with an acid under the above-described conditions, a part of the dielectric layer on the surface thereof dissolves, the pore volume decreases and the average pore size increases. Also, when photographed through an electron microscope that the peak portions of a burr on the cut end are dissolved.

Figure 2:
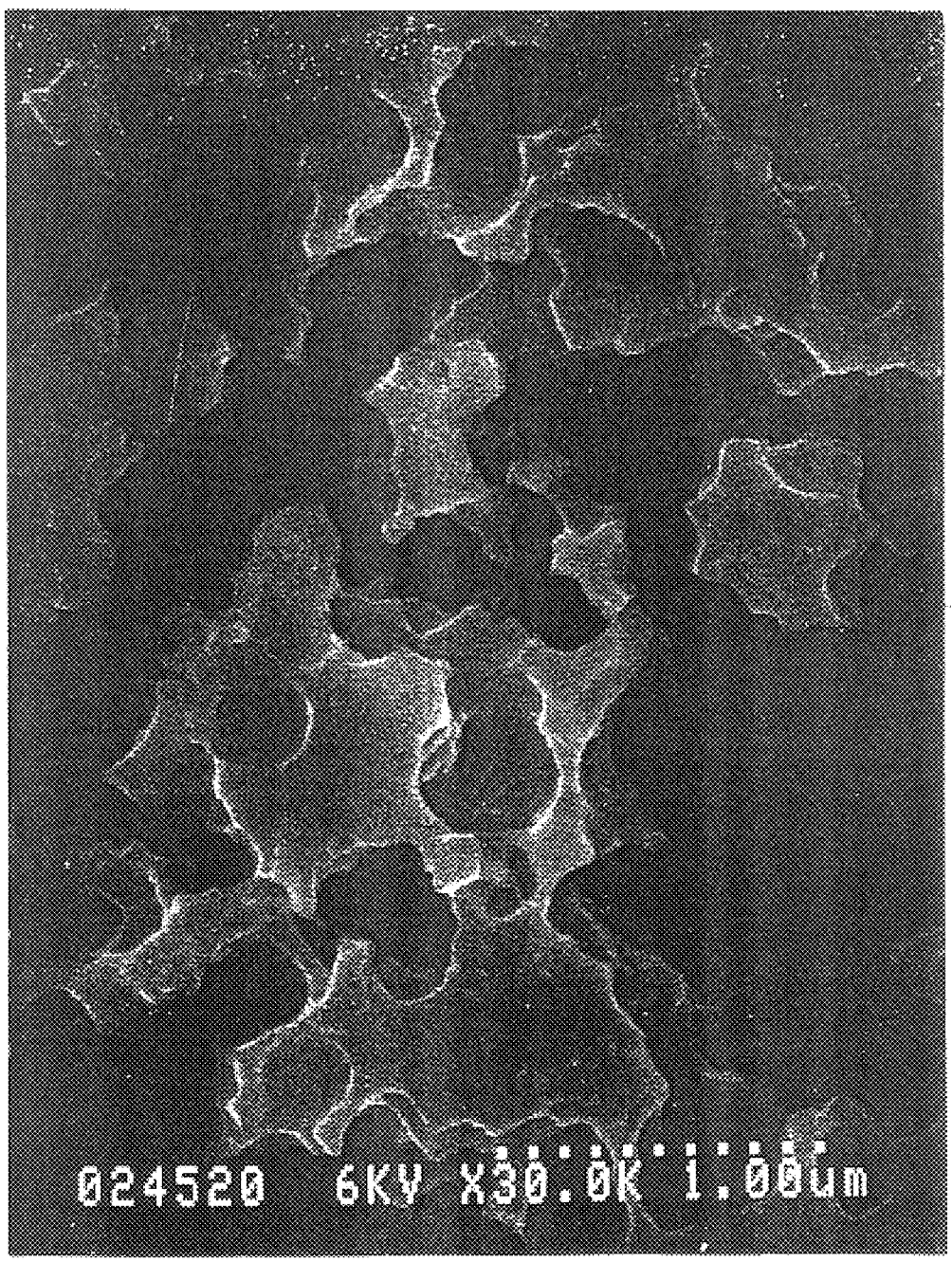
FIG. 2 is a scanning electron microscope picture (×30,000) showing a cross section of a dielectric film before an acid treatment.

FIG. 1 is a scanning electron microscope picture (×30,000) showing the surface of a chemically formed aluminum foil after the treatment according to the present invention. FIG. 2 is a scanning electron microscope picture (×30,000) showing the surface of an untreated chemically formed aluminum foil surface.

As shown in FIGS. 1 and 2, the shape of the surface of a chemically formed aluminum foil is not greatly changed by the acid treatment.

The pore distribution on the surface of a chemically formed film of an untreated chemically formed aluminum foil, the average pore size is from 490 to 590 Å and the pore volume is from 1.44 to 1.54 cm$^3$/g, whereas after the acid treatment, the average pore size is from 600 to 2,000 Å and the pore volume is from 0.1 to 1.4 cm$^3$/g.

Figure 3A:
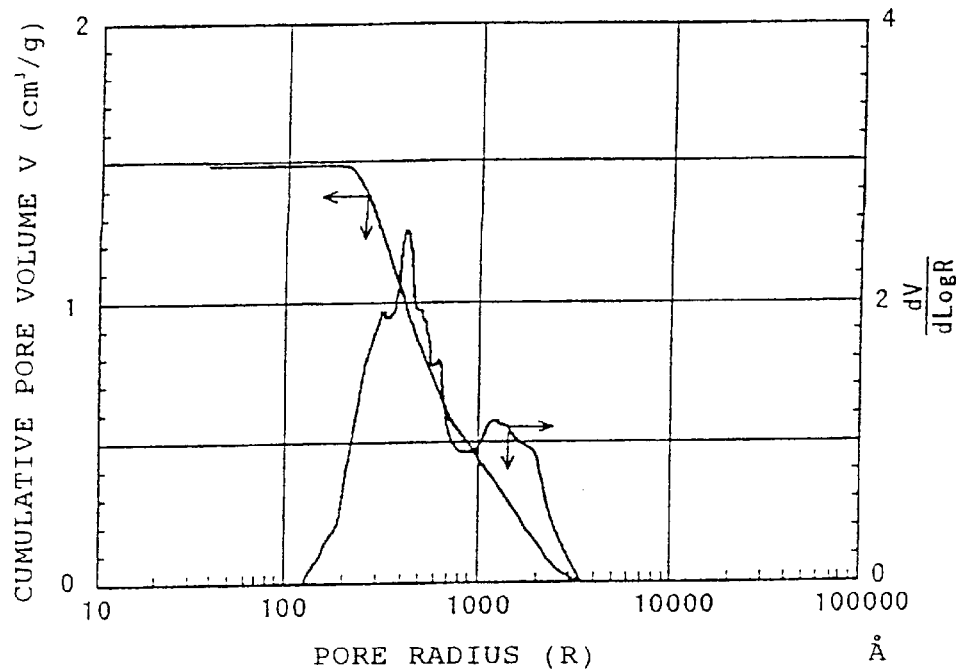
FIG. 3A is a pore distribution curve showing the pore distribution on the dielectric film surface before an acid treatment.
Figure 3B:
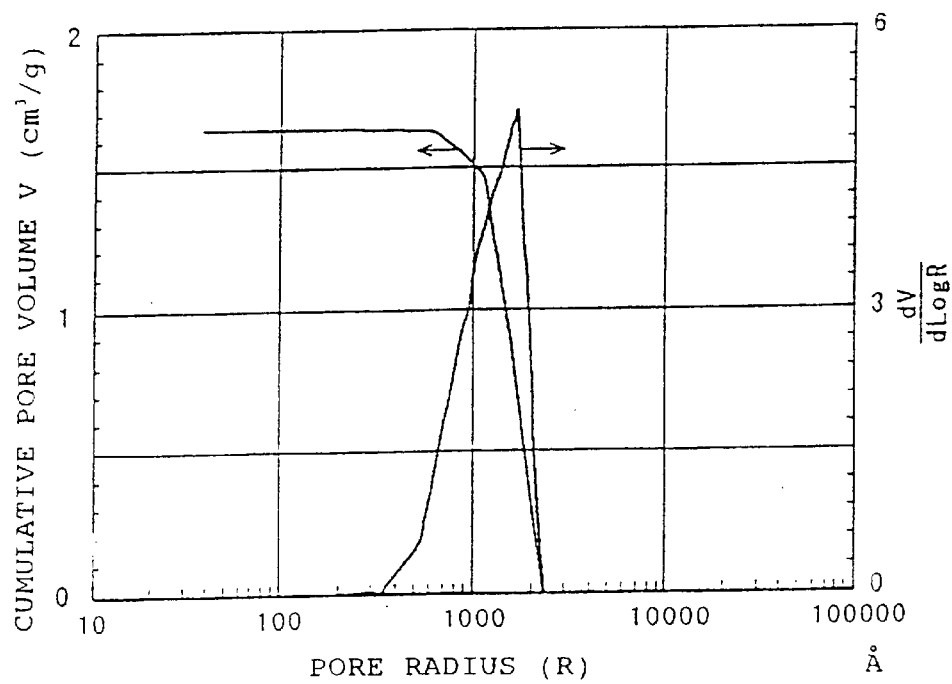
FIG. 3B is a pore distribution curve showing the pore distribution on the dielectric film surface after an acid treatment.

FIGS. 3A and 3B are pore distribution curves showing a dispersion in pore distribution before and after the acid treatment (Comparative Example 1 and Example 3 described later). FIGS. 3A and 3B are graphs showing the change in the pore volume (V) with respect to the change in the pore radius (R), where the ordinate in the right shows the variation (dV/dLogR) and the ordinate in the left side shows the cumulative pore volume (V). After the treatment, the dispersion in the pore distribution is small and the average pore radius is large (Example 3, FIG. 3B) compared with those before the treatment (Comparative Example 1, FIG. 3A).

In the chemical re-forming treatment, conditions may be selected so that only the exposed ground metal portion can be selectively formed without damaging the dielectric film formed on the effective surface of the chemically formed foil. Specifically, using an electrolytic solution containing an acid, such as adipic acid, boric acid or phosphoric acid, a constant-current chemical forming is performed using the core part of the chemically formed foil as the anode, under conditions so that the concentration of electrolytic solution is from 0.95 to 20% by mass, the temperature is from 0 to 90° C., the current density is from 0.1 to 2,000 mA/cm$^3$ and the current passing time is within 60 minutes.

The thickness of the valve acting metal foil varies depending on the use end. However, for example, a foil having a thickness of about 40 to 150 μm is generally used. Furthermore, the size and the shape of the valve acting metal foil vary depending on the use. However, as a plate-like device unit, the metal foil preferably has a rectangular form with a width of about 1 to 50 mm and a length of about 1 to 50 mm, more preferably a width of about 2 to 15 mm and a length of about 2 to 25 mm.

The electrically conducting polymer for forming the solid electrolyte used in the production method of a solid electrolytic capacitor of the present invention is a polymer having a π electron-conjugate structure and the polymerization degree thereof is preferably from 2 to 2,000, more preferably from 5 to 1,000. Specific examples of the polymer include electrically conducting polymers containing, as a repeating unit, a structure shown by a compound having a thiophene skeleton, a compound having a polycyclic sulfide skeleton, a compound having a pyrrole skeleton, a compound having a furan skeleton or a compound having an aniline skeleton.

Among the compounds (monomers) used as a starting material of the electrically conducting polymer, specific examples of the compound having a thiophene skeleton include 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds may be a compound generally available on the market or may be prepared by a known method (a method described, for example, in *Synthetic Metals*, Vol. 15, page 169 (1986)), however, the present invention is by no means limited thereto. Specific examples of the compound having a polycyclic sulfide skeleton include compounds having a 1,3-dihydropolycyclic sulfide (also called 1,3-dihydrobenzo-[c]thiophene) skeleton and compounds having a 1,3-dihydronaphtho[2,3-c]thiophene skeleton. Furthermore, compounds having a 1,3-dihydroanthra[2,3-c]thiophene skeleton and compounds having a 1,3-dihydronaphthaceno[2,3-c]thiophene skeleton may be used. These compounds may be prepared by a known method, for example, the method described in JP-A-8-3156. In addition, 1,3-dihydrophenanthra[2,3-c]thiophene derivatives as a compound having a 1,3-dihydronaphtho[1,2-c]thiophene skeleton, and 1,3-dihydrobenzo[a]-anthraceno[7,8-c]thiophene derivatives as a compound having a 1,3-dihydrotriphenylo[2,3-c]thiophene skeleton may also be used.

A compound in which the condensed ring arbitrarily contains nitrogen or N-oxide may also be used. Examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds may be a compound available on the market or may be prepared by a known method. Examples of the compound having an aniline skeleton include derivatives such as 2-methylaniline, 2-ethylaniline, 2-propylaniline, 2-butylaniline, 2-pentylaniline, 2-hexyl-aniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3-ethylenedioxyaniline. These compounds may be a commercially available compound or may be prepared by a known method.

The solid electrolyte produced by the method of the present invention has an electric conductivity of about 0.1 to 200 S/cm, preferably from about 1 to 150 S/cm, more preferably from about 10 to 100 S/cm.

The conditions for polymerization of the compound selected from the group consisting of the above-described compounds are not particularly limited and polymerization is performed after confirming the conditions by preliminarily performing a simple test.

For example, a method of coating a 3,4-ethylenedioxythiophene monomer and an oxidizing agent, each preferably in the solution form, separately one after the other or simultaneously on the dielectric film to form a solid electrolyte layer may be used (JP-A-2-15611 and JP-A-10-32145). A method of alternately dipping the chemically formed substrate in a monomer solution and in an oxidizing agent solution is particularly preferred.

In general, a compound (dopant) having a doping ability is used for the electrically conducting polymer. The dopant can be add to either the monomer solution or the oxidizing agent solution. The dopant is preferably an aryl sulfonate-based dopant and, for example, a salt of benzenesulfonic acid, toluenesulfonic acid, naphthalene-sulfonic acid or anthraquinonesulfonic acid may be used.

On the solid electrolyte layer, an electrically conducting layer is provided using electrically conducting paste or plating to attain good electrical contact with the cathode lead terminal. Thereafter, a cathode lead terminal is connected and then, the capacitor is applied with a jacket using resin mold, resin case, metal-made outer-jacket case, resin dipping or the like, thereby manufacturing a solid electrolytic capacitor for various uses.

EXAMPLES

The present invention is described below by referring to the Examples and Comparative Examples, however, the present invention is not limited to the following Examples. Unless indicated otherwise herein, all parts, percents, ratios and the like are by weight.

Example 1

A chemically formed aluminum foil (100LJA19B13VF, trade name, produced by JCC (NIPPON CHIKUDENKI KOGYO)) (withstand rated voltage: 13 VF) having formed on the surface thereof a chemically formed film having an average pore radius of 540 Å and a pore volume of 1.49 cm$^3$/g, was cut into a width of 3 mm and a length of 13 mm and divided into a cathode part and an anode part by a masking member. The side undertaking the cathode part was dipped in an aqueous 5 mass% oxalic acid solution for 30 seconds, washed with water and dried. Thereafter, the pore distribution (pore volume and average pore radius) of the chemically formed aluminum substrate was measured by mercury intrusion porosimetry using porosimeter 2000WS manufactured by Fisons. The results are shown in Table 1.

Subsequently, using an aqueous 10 mass % ammonium adipate as an electrolytic solution, the foil was chemically re-formed under conditions so that the temperature was 55° C., the voltage was 13 V, the electric current density was 5 mA/cm$^2$ and the current passing time was 10 minutes to form a dielectric film on the cut end part. As a result of observation through an electron microscope, it was confirmed that burrs on the cut surface and peak portions of the cut end were dissolved and removed to give a rounded shape.

Thereafter, the cathode part was dipped in 1 mol/l of an isopropyl alcohol solution of 3,4-ethylenedioxythiophene, left standing for 2 minutes, dipped in a mixed aqueous solution of an oxidizing agent (ammonium persulfate: 1.8 mol/l) and a dopant (sodium anthraquinone-2-sulfonate: 0.06 mol/l), and left standing at 45° C. for 5 minutes. This operation was repeated 25 times, followed by washing with water, to form an electrically conducting layer. Carbon paste and silver paste were stacked in this order to form an electrically conducting layer on the electrically conducting layer. Four sheets of the thus-obtained devices were disposed on a lead frame, one on another through silver paste in the cathode side, and by welding in the anode side. Subsequently, the entire structure was molded with a molding resin to fabricate a capacitor device. 2000 Units of the devices in total were manufactured. Each device was aged at 8 V and 105° C. for 1 hour and then the electrostatic capacitance and the leakage current characteristics were measured. The results are shown in FIG. 2.

The leakage current characteristics were evaluated by the leakage current (LC) calculated while setting the threshold value to 0.03 CV by applying a rated voltage (6.3 V) to the capacitor device and measuring the leakage current after 1 minute.

Example 2

A capacitor device was manufactured in the same manner as in Example 1, except for changing the dipping time in oxalic acid to 60 seconds, and then measuring the electrostatic capacitance and the leakage current characteristics. The measurement results of the average pore radius and the pore volume of the chemically formed film are shown in Table 1 and the measurement results of the electrostatic capacitance and the leakage current characteristics are shown in Table 2.

Example 3

A capacitor device was manufactured in the same manner as in Example 1, except for changing the dipping time in oxalic acid to 120 seconds, and then measuring the electrostatic capacitance and the leakage current characteristics. The relationship between the variation (dV/dLogR) of the pore volume (V) and the cumulative pore volume with respect to the change in the pore radius (R) of the chemically formed film is shown in FIG. 3B, the measurement results of the average pore radius and the pore volume of the chemically formed film are shown in Table 1, and the measurement results of the electrostatic capacitance and the leakage current characteristics are shown in Table 2.

Example 4

A capacitor device was manufactured in the same manner as in Example 1, except for changing the dipping time in oxalic acid to 180 seconds, and then measuring the electrostatic capacitance and the leakage current characteristics. The measurement results of the average pore radius and the pore volume of the chemically formed film are shown in Table 1 and the measurement results of the electrostatic capacitance and the leakage current characteristics are shown in Table 2.

Example 5

A capacitor device was manufactured in the same manner as in Example 1, except for changing the dipping time in oxalic acid to 300 seconds, and then measuring the electrostatic capacitance and the leakage current characteristics. The measurement results of the average pore radius and the pore volume of the chemically formed film are shown in Table 1 and the measurement results of the electrostatic capacitance and the leakage current characteristics are shown in Table 2.

Example 6

A capacitor device was manufactured in the same manner as in Example 1, except for changing the dipping time in oxalic acid to 10 seconds, and then measuring the electrostatic capacitance and the leakage current characteristics. The measurement results of the average pore radius and the pore volume of the chemically formed film are shown in Table 1 and the measurement results of the electrostatic capacitance and the leakage current characteristics are shown in Table 2.

Comparative Example 1

A capacitor device was manufactured in the same manner as in Example 1, except for not performing the dipping in oxalic acid, and then measuring the electrostatic capacitance and the leakage current characteristics. The relationship between the variation (dV/dLogR) of the pore volume (V) and the cumulative pore volume with respect to the change in the pore radius (R) of the chemically formed film is shown in FIG. 3A, the measurement results of the average pore radius and the pore volume of the chemically formed film are shown in Table 1, and the measurement results of the electrostatic capacitance and the leakage current characteristics are shown in Table 2.

TABLE 1

|  | Dipping Time in Oxalic Acid | Pore Volume ($cm^3/g$) | Average Pore Radius (Å) |
| --- | --- | --- | --- |
| Example 1 | 30 sec. | 0.18 | 1840 |
| Example 2 | 60 sec. | 0.17 | 1800 |
| Example 3 | 120 sec. | 0.16 | 1520 |
| Example 4 | 180 sec. | 0.17 | 1640 |
| Example 5 | 300 sec. | 0.18 | 1810 |

TABLE 1-continued

|  | Dipping Time in Oxalic Acid | Pore Volume ($cm^3/g$) | Average Pore Radius (Å) |
| --- | --- | --- | --- |
| Example 6 | 10 sec. | 1.45 | 510 |
| Comparative Example 1 | not dipped | 1.49 | 540 |

TABLE 2

|  | Dipping Time in Oxalic Acid | Electrostatic Capacitance ($\mu F$) | Deviation of Electrostatic Capacitance | LC* Yield (%) |
| --- | --- | --- | --- | --- |
| Example 1 | 30 sec. | 51.3 | 0.9 | 94 |
| Example 2 | 60 sec. | 52.2 | 0.8 | 97 |
| Example 3 | 120 sec. | 51.3 | 0.8 | 96 |
| Example 4 | 180 sec. | 51.6 | 0.8 | 97 |
| Example 5 | 300 sec. | 51.8 | 0.9 | 94 |
| Example 6 | 10 sec. | 50.1 | 1.4 | 90 |
| Comparative Example 1 | not dipped | 50.0 | 1.5 | 90 |

*LC: leakage current

As seen from Tables 1 and 2, the chemically formed film passed through dipping treatment in an oxalic acid for 30 seconds or more exhibited increased electrostatic capacitance of the capacitor despite the reduction in the pore volume and increase in the average pore radius compared with those obtained through no dipping treatment (Comparative Example 1) or a dipping treatment in oxalic acid only for 10 seconds (Example 6). Also, the electrostatic capacitance deviation (dispersion) and LC yield were improved.

The chemically formed aluminum substrate of the present invention, where the dielectric layer surface is treated with a specific aqueous acid solution, is made uniform on the surface of the chemically formed film and exhibits good adhesion to the electrically conducting polymer (solid electrolyte), and the solid aluminum electrolytic capacitor using the substrate is favored with a large electrostatic capacitance and a small dispersion in the electrostatic capacitance compared with those that were not subjected to the acid treatment. Furthermore, burrs generated during cutting and peak portions of the cut end are dissolved and removed to give a rounded shape. As a result, the electric characteristics such as leakage current characteristics are improved.

While the invention has been described in detail and with reference to specific embodiments thereof, it will be apparent to one skilled in the art that various changes and modifications can be made therein without departing from the spirit and scope thereof.

What is claimed is:

1. A method for producing an aluminum solid electrolytic capacitor, comprising cutting a chemically formed aluminum substrate having thereon an aluminum oxide dielectric film into a predetermined shape, treating the chemically formed aluminum substrate with an aqueous acid solution to dissolve a part of the dielectric film on the substrate surface, and providing an organic electrically conducting polymer as a solid electrolyte on the chemically formed aluminum substrate.

2. A method for producing an aluminum solid electrolytic capacitor, comprising cutting a chemically formed aluminum substrate having thereon an aluminum oxide dielectric film into a predetermined shape, treating the chemically formed aluminum substrate with an aqueous acid solution to dissolve a part of the dielectric film on the substrate surface and burrs generated during cutting, and providing an organic electrically conducting polymer as a solid electrolyte on a chemically formed aluminum substrate.

3. The method for producing an aluminum solid electrolytic capacitor as claimed in claim 1 or 2, wherein the aqueous acid solution comprises an acid selected from the group consisting of sulfuric acid, oxalic acid, chromic acid and phosphoric acid.

4. The method for producing an aluminum solid electrolytic capacitor as claimed in claim 3, wherein the aqueous acid solution is an aqueous oxalic acid solution.

5. The method for producing an aluminum solid electrolytic capacitor as claimed in claim 4, wherein a concentration of the aqueous oxalic acid solution is from about 0.1 to about 15% by mass.

6. The method for producing an aluminum solid electrolytic capacitor as claimed in claim 1 or 2, wherein the treatment with an aqueous acid solution is a dipping treatment of the chemically formed aluminum substrate.

7. The method for producing an aluminum solid electrolytic capacitor as claimed in claim 6, wherein the aqueous acid solution is an aqueous oxalic acid solution having a concentration of about 0.1 to about 15% by mass, a dipping time is from about 20 seconds to about 10 minutes, and a treatment temperature is from about 15 to about 40° C.

8. The method for producing an aluminum solid electrolytic capacitor as claimed in claim 1 or 2, further comprising chemically re-forming the aluminum cut surface after the treatment with an aqueous acid solution.

* * * * *